United States Patent
Gendro (10) Patent No.: US 7,644,306 B2
(45) Date of Patent: Jan. 5, 2010

(54) METHOD AND SYSTEM FOR SYNCHRONOUS OPERATION OF AN APPLICATION BY A PURALITY OF PROCESSING UNITS

(75) Inventor: Stephen Lynn Gendro, Fall City, WA (US)

(73) Assignee: Boeing Company, Chicago, IL (US)

( * ) Notice: Subject to any disclaimer, the term of this patent is extended or adjusted under 35 U.S.C. 154(b) by 373 days.

(21) Appl. No.: 11/611,217

(22) Filed: Dec. 15, 2006

(65) Prior Publication Data

US 2008/0148023 A1 Jun. 19, 2008

(51) Int. Cl.
*G06F 11/00* (2006.01)

(52) U.S. Cl. ........................................ 714/12
(58) Field of Classification Search ............... 714/12
See application file for complete search history.

(56) References Cited

U.S. PATENT DOCUMENTS

| | | | | |
|---|---|---|---|---|
| 6,298,455 | B1 * | 10/2001 | Knapman et al. | 714/43 |
| 6,779,002 | B1 * | 8/2004 | Mwaura | 707/203 |
| 7,350,026 | B2 * | 3/2008 | Popescu et al. | 711/119 |
| 2004/0243256 | A1 * | 12/2004 | Willis et al. | 700/21 |
| 2005/0165858 | A1 * | 7/2005 | Tom et al. | 707/201 |
| 2007/0094308 | A1 * | 4/2007 | Mitchell et al. | 707/201 |
| 2008/0027996 | A1 * | 1/2008 | Morris | 707/200 |

* cited by examiner

*Primary Examiner*—Christopher S McCarthy
(74) *Attorney, Agent, or Firm*—Law Office of Donald D. Mondul (57) ABSTRACT

A method for effecting synchronized operation of an application by a plurality of processing units, each processing unit may include an application processing section coupled with an own data store and a communication section coupled for communications with other processing units, includes: (a) operating each processing unit to store data relating to the operation of the application in its own data store; (b) recognizing a processing unit experiencing an anomalous event disruptive of data as a needy processing unit; and (c) when the anomalous event is past, operating the needy processing unit to effect access to all other data stores than its own data store to obtain updated data. The access may be effected by the needy processing unit operating as a subscriber unit communicating with respect to the other data store operating as a publisher unit.

17 Claims, 3 Drawing Sheets

METHOD AND SYSTEM FOR SYNCHRONOUS OPERATION OF AN APPLICATION BY A PURALITY OF PROCESSING UNITS

TECHNICAL FIELD

The disclosure is directed to application processing units, and especially to application processing units operating with substantially the same application substantially simultaneously.

BACKGROUND

A problem with operating a plurality of processing units using the same application substantially simultaneously is a user is not able to use more than one master file or application at a time. Another problem is how a user may deal with an operating outage at a data source site because of a network outage at the data store site or for another reason. Such operating outages may cause users to be unable to access application functionality because of lack of data access. The data may not be available at the particular location needed but may be saved at another location. Because of cost, or an inability to employ proprietary solutions or for another reason, some prior art systems and methods have employed software-dependent or hardware-dependent approaches that provide a single master processing unit with one or more alternate processing units employed as backup processing units. Such an arrangement is not a true multi-master arrangement as is required for properly operating a plurality of processing units substantially simultaneously.

There is a need for a method and system for operating a plurality of processing units that provides high availability and a redundant data store or data store system with automatic failover and restore capabilities.

SUMMARY

A method for effecting synchronized operation of an application by a plurality of processing units. Each processing unit includes an application processing section coupled with an own data store and a communication section coupled for communications with other processing units. Each processing unit may include: (a) operating each processing unit to store data relating to the operation of the application in its own data store; (b) recognizing a processing unit experiencing an anomalous event disruptive of data as a needy processing unit; and (c) when the anomalous event is past, operating the needy processing unit to effect access to all other data stores than its own data store to obtain updated data. The access may be effected by the needy processing unit operating as a subscriber unit communicating with respect to the other data stores operating as a publisher unit.

A system for effecting substantially synchronous operation of an application by a plurality of processing units may include: (a) in each respective processing unit of the plurality of processing units: (1) a respective application processing section; (2) a respective own data store coupled with the respective application processing section; and (3) a respective communication section coupled with at least one of the respective own data store and the respective application processing section; and (b) communication access vias coupling each the respective communication section for effecting communications with other processing units of the plurality of processing units than the respective processing unit. Each respective processing unit stores data may relate to operation of the application in the respective own data store. The plurality of processing units may be configured so that when a disrupting event renders a respective processing unit a needy processing unit, the needy processing unit may access all other the data stores than the own data store to obtain updated data. The needy processing unit operates as a subscriber unit communicating with respect to the other data stores operating as a publisher unit.

It may be a feature of the disclosure to provide a high availability, redundant data store or data store system with automatic failover and restore capabilities.

An embodiment may provide such a redundant data store system and method for using the data store system permitting one to connect to any one of several master data sources. The method and system of the disclosure permits one to create, update or delete records in all respective data stores of the several redundant data stores as substantially concurrently as possible when the several master data stores are connected and operational. If a data store is disconnected or otherwise not operational, the disclosure permits updating the disconnected or otherwise not operational data store substantially immediately upon regaining an operational condition.

Further features of embodiments of the disclosure may be apparent from the following specification and claims when considered in connection with the accompanying drawings, in which like elements are labeled using like reference numerals in the various figures, illustrating the preferred embodiments of the disclosure.

DETAILED DESCRIPTION OF THE PREFERRED EMBODIMENT

The disclosure employs a software architecture that maintains data synchronization among any number of data stores. Each data store may be used concurrently as a master to create, update and delete data records from any number of data stores tied together in the same architecture. If one of the data stores is removed because of maintenance or an outage, the other data stores may queue up all transactions and will resynchronize the down data store when it is reintroduced.

In its preferred embodiment, the system of the disclosure may be configured to recover from service outages automatically by providing a highly available redundant environment in which many types of applications can be operated. The system may be configured using a single stream or multiple stream arrangement. The system may decouple the application from its related data store changes and locate multiple sets of data accessible by multiple sets of users.

The software architecture of the disclosure is preferably hardware independent, database independent, program language independent and vendor independent. The disclosure may provide expandable redundancy that may be established in a monad, a double, a triple, a quadruple, a quintuple or more complex configuration.

Speed of data replication may be limited in the system of the disclosure by the underlying hardware platform. The system and method of the disclosure may require re-engineering of existing application code in some cases, but there need not be any dependency on any particular database, operating system, hardware or software.

The embodiments of the disclosure operate to automate the replication of the data in an application to achieve high availability of the system as a whole. The replication of data may provide multiple concurrent sources from which the data may be accessed and to which updated data may be written. The disclosure also may provide a capability for automated recovery if any of the data sources stop working.

The general case in a computer application is that the application processes data in a standard order of events. This order of events generally may be as follows:

1) The data may be collected in the application from the user, from other systems and from at least one data source.

There are generally three ways that data may be collected in an application:

The User—Implementing the disclosure requires no substantial change in the way that information may be collected and shown to a user.

Other Systems—Implementing the disclosure requires no substantial change in the way that information may be collected from other systems.

The Data Source—A connection object used by an application to get data from a data store should be updated to enable connection by the application to all data stores at all processing units in the system, preferably only one at a time. The data connection preferably automatically fails over to a next data store if a current data store becomes unavailable. The initial connection to an initial data store is preferably determined randomly in order to effect load balancing among the number of connections by any one processing unit or server with various data stores. After an initial connection with a data store, the connection object or vehicle by a server with a data store preferably should periodically connect with other data stores, such as by way of example and not by way of limitation, effecting a round robin of connections with other data stores.

2) The application or the user may create update or delete data in the context of the application.

There are generally three ways that data may be changed in the context of an application:

a) Creates—A creation of data may require the application to formulate an insert statement that is compatible to the data source being used. Because all tables in the data source are preferably designed to have a unique numeric primary key generated by a sequence generator, a first step may be to acquire a next key from the data source currently to which a processing unit (and its associated application) is connected. The unique key is preferably employed to complete an insert statement that will create a new row in the data source. All rules that constrain the data should preferably be applied at this time to ensure that the data is valid and will enable the insert to work at the time it is needed. Any date and time stamping of the data should preferably be effected during the creation of the insert statement, otherwise the inserted data will not be identical in all data sources upon completion of insert.

b) Updates—It is preferred that all updates use a primary key. Any date and time stamping of the data needs should preferably be effected during the creation of the update statement, otherwise the updated data will not be identical in all data sources upon completion of the update.

c) Deletes—Any deletion of data preferably may require the use of a primary key as a matter of good practice.

3) The application may submit a data store change request to the interface of the data store.

The data store change request preferably follows a different path—a change request path—from the connection with the data store in order to read data from the data store. This change request path preferably employs a publish/subscribe architecture and can be implemented in various ways so long as publish/subscribe architecture substantially adheres to the following rules:

a) The payload of the published message is a complete data store change request.

b) The storage locations of the input publish queues of the various hosts are situated at the hosts that originated the message.

c) The storage locations of the various output subscribe queues are on the hosts that consume the messages.

d) For each message put into any of the publish queues, the message is moved to each of the respective output subscribe queues.

e) The method that moves the messages from the publish queues to the subscribe queues guarantees one and only one delivery of each message.

f) The order of the messages is maintained.

4) The interface to the data store may request the change to the data in the data store.

The data store change request process is preferably a stand alone process on each host. The data store change request process reads messages from the publish queues and processes the change requests to the data store, preferably one at a time in the order the change request is picked from the queue. Data store reads are preferably not processed in this path, only data store change requests. The order of the data change requests is preferably the same on all data stores so all data stores will be synchronized with substantially the same data flow. Because of network and server performance issues, all data on all tables will not likely be 100% identical at all times. Identicality depends on the differences of the back logged change requests on each of the various hosts.

5) The data store may report whether or not the change request was successful. Whether the change request was successful is preferably monitored by the stand alone process described in (4) above. As long as the application codes the change request properly the change request should work on all various hosts in substantially the same manner without problems. If there are problems, they are found and fixed during development and testing of the application. Any production problems are logged with the complete change request, so that the change request can be processed at a later time when the problem is resolved.

6) The application may act upon the success or failure of the change request. Because there is no direct link between the change request and the application this step may be the most difficult step in the entire process. If everything operates properly as planned every change request will work without problem. Any failure is recorded in a log file so that the failed operation or step can be taken care of manually in the future. Below are listed representative options regarding how an application may be directed to act after the submittal of a change request:

a) Do nothing and continue on with normal processing. This option is based upon a presumption that the problem will be logged and fixed later.
b) Query the data store for results of the change request and verify that the change requested did occur. This option may be used for critical change requests to validate their success.
c) Establish a new interface to query multiple data stores to validate success of the change request in multiple sites. Care must be taken when using this option because, if the application requires that a change request must be successfully put in all servers, then a down server will stop the application from running on every server.

In order to implement the disclosure in the context of the above-described application processes, a user may first decide how many data sources are needed. The number of data sources needed determines the number complete instances of the application that are required for the desired implementation. Each instance of the application requires a separate host, data source, and application-run environment. It is preferred that each host, data source and application-run environment be setup as identical as possible to other instances of the application in the system so that the performance characteristics of all instances of the application may be substantially the same. Each host is designated by a unique identifier, such as a number from 0 to n–1 for n hosts. The unique identifier may be used as an identifier to distinguish the solution algorithms generated by the various instances of the application among the various hosts.

It is preferred that each instance of the application provide a unique key, such as by way of example and not by way of limitation a unique numeric key generated by a sequence generator, for each table in each data store. Implementation of this feature may be dependent on the particular application and data source employed. By way of example and not by way of limitation, the sequence generator for each table in each data source may be established as follows:
1) The starting number may be the designated unique identifier associated with the host. This guarantees a unique starting value.
2) The next number in the sequence is preferably always N more than the current number, where N is preferably an integer.

This approach to sequence generation can assure that each data source will generate unique numbers that are different from other data sources in the system. This generation of unique numbers enables each data source to independently master new records for the application.

In order to assure high reliability it is preferred that each host be located in a different geographical location. Geographical separation insures that an uncontrollable circumstance in one locale will not likely prevent the application from running and being available in other locales than the one locale. To assure geographical separation, different geographical locations may be regarded as generally meaning different time zones. The running of the redundant data master for an application preferably requires that different instances of the application running on different hosts are run according to a synchronized clock.

In order for an application to recover automatically from an outage, it is preferred that a complete set of startup and shutdown scripts be installed on all the hosts in the system. These startup and shutdown scripts are preferably customized to each particular host, data source and application to assure that the scripts successfully effect startup of all necessary processes without problems after a host restarts. The processes in the startup script are preferably created to effect blocking users from accessing the local data store until the data synchronization for the local data store has finished.

The following factors are important to the capability of the system of the disclosure to auto-recover from outages:
1) An ability to block users from accessing data from a data store when the data store is running out of sync with other data stores.
This ability may be assured, by way of example and not by way of limitation, by changing the connection object with a data store to automatically round robin (or otherwise rotate) to a next data store when the current data store becomes unavailable. In this case unavailable also means that the current data store is out of sync with other data stores.
2) The ability to store up change requests on an originating server.
Using a publish/subscribe methodology to concurrently store change requests for multiple servers creates a change request process that is decoupled from application execution. This decoupling permits any of the servers to have an outage without losing data that is needed to recover the failed server back to working condition. During an outage the down server or host does not produce any change requests for the other hosts, so the application keeps running on the other hosts without problems.

The disclosure decouples application execution from direct data source changes. This decoupling enables more flexibility in how the changes are effected in the various data stores. Requiring that every table have a unique numeric key enables the application to source that key from any of multiple locations, therefore being able to have access to multiple masters simultaneously. By storing the original copy of the changes on the originating server, the system of the disclosure establishes any number of remote servers capable of being updated concurrently or at a later time.

Figure 1:
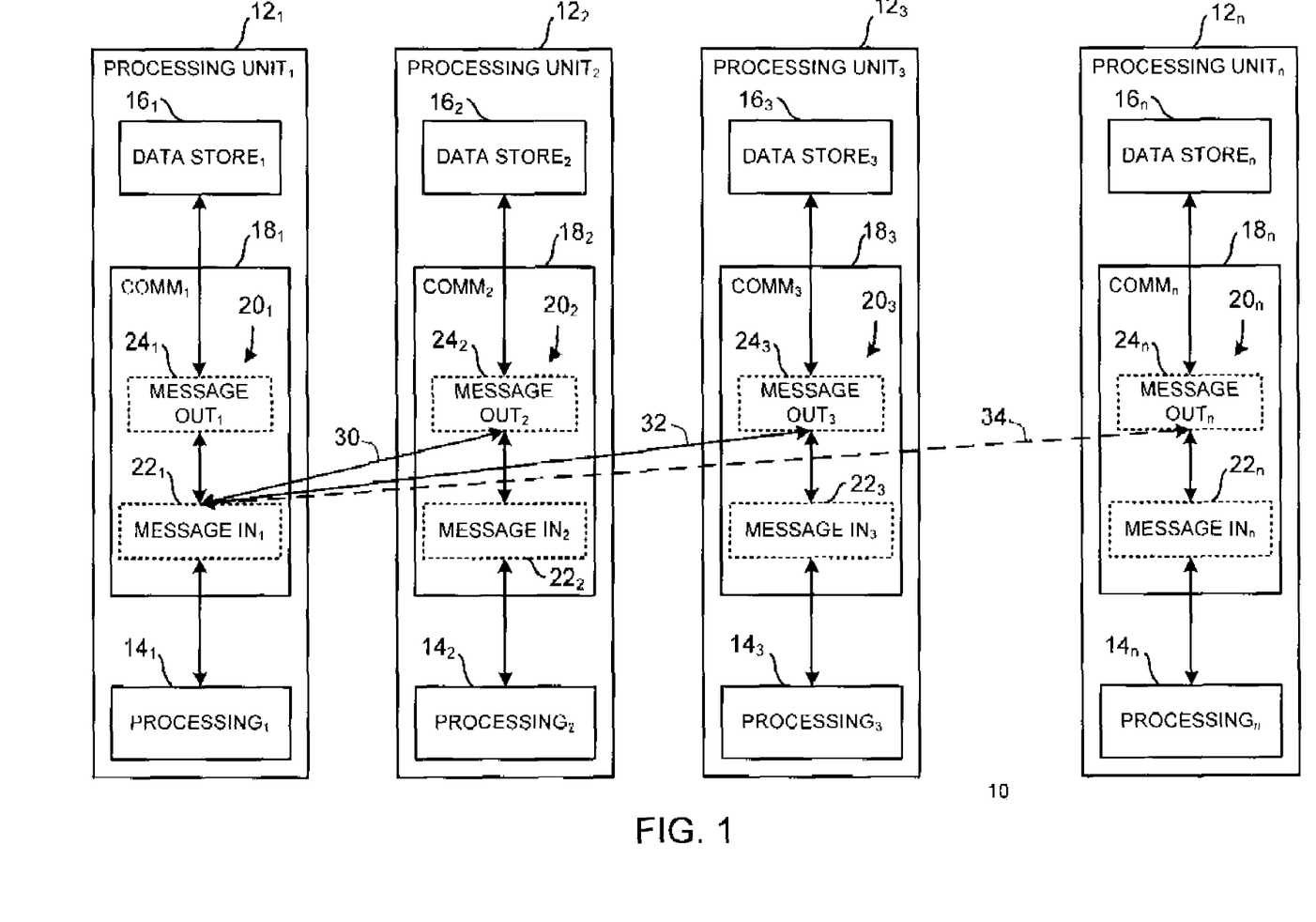
FIG. 1 illustrates the process of the disclosure.

FIG. 1 illustrates the process of the disclosure. In FIG. 1, a process 10 is described in connection with effecting synchronization of data relating to processing of an application among a plurality of processing units $12_1$, $12_2$, $12_3$, $12_n$. The indicator "n" is employed to signify that there can be any number of processing units employed using process 10. The inclusion of four processing units $12_1$, $12_2$, $12_3$, $12_n$ in FIG. 1 is illustrative only and does not constitute any limitation regarding the number of processing units that may be employed with the process and system of the disclosure.

Each respective processing unit $12_n$ may include a respective processing section $14_n$, a respective data store $16_n$ and a respective communication section $18_n$. Each respective communication section $18_n$ may be configured to include a publish/subscribe unit $20_n$ having a message-in portion $22_n$ and a message-out portion $24_n$. Thus, processing unit $12_1$ may include a processing section $14_1$, a data store $16_1$ and a communication section $18_1$. Communication section $18_1$ may be configured to include a publish/subscribe unit $20_1$ having a message-in portion $22_1$ and a message-out portion $24_1$. Processing unit $12_2$ may include a processing section $14_2$, a data store $16_2$ and a communication section $18_2$. Communication section $18_2$ may be configured to include a publish/subscribe unit $20_2$ having a message-in portion $22_2$ and a message-out portion $24_2$. Processing unit $12_3$ may include a processing section $14_3$, a data store $16_3$ and a communication section $18_3$. Communication section $18_3$ may be configured to include a publish/subscribe unit $20_3$ having a message-in portion $22_3$ and a message-out portion $24_3$. Processing unit $12_n$ may include a processing section $14_n$, a data store $16_n$ and a communication section $18_n$. Communication section $18_n$ may be configured to include a publish/subscribe unit $20_n$ having a message-in portion $22_n$ and a message-out portion $24_n$.

Each processing unit $12_n$ may receive data from a respective processing unit $14_n$ at a respective message-in portion $22_n$ of a respective publish/subscribe unit $20_n$. Data received from other sources such as, by way of example and not by way of limitation, user inputs (not shown in FIG. 1) may also be preferably received via a respective message-in portion $22_n$. Data may be provided by each respective publish/subscribe unit $20_n$ to other entities via a respective message-out portion $24_n$. Only one set of arrows illustrating an inter-unit provision of data is illustrated in FIG. 1 in order to avoid cluttering FIG. 1. One skilled in the art of process and system design may easily understand the following description using only the arrows provided.

Publish/subscribe units $20_n$ may control intra-unit and inter-unit transfers of data. Thus, message-in portion $22_1$ may control transfer of data received by processing unit $12_1$ from processing section $14_1$ (or from other data sources). An intra-unit data transfer within processing unit $12_1$ to data store $16_1$ may be effected via message-out portion $24_1$. An inter-unit transfer from processing unit $12_1$ to processing unit $12_2$ may be effected by operating processing unit $12_2$ as a subscriber unit with respect to publish/subscribe unit $20_1$ so that data may be transferred from message-in portion $22_1$ to message-out portion $24_2$, as indicated by an arrow 30. An inter-unit transfer from processing unit $12_1$ to processing unit $12_3$ may be effected by operating processing unit $12_3$ as a subscriber unit with respect to publish/subscribe unit $20_1$ so that data may be transferred from message-in portion $22_1$ to message-out portion $24_3$, as indicated by an arrow 32. An inter-unit transfer from processing unit $12_1$ to processing unit $12_n$ may be effected by operating processing unit $12_n$ as a subscriber unit with respect to publish/subscribe unit $20_1$ so that data may be transferred from message-in portion $22_1$ to message-out portion $24_n$, as indicated by an arrow 34.

An intra-unit data transfer within processing unit $12_2$ to data store $16_2$ may be effected via message-out portion $24_2$. An inter-unit transfer from processing unit $12_2$ to processing unit $12_1$ may be effected by operating processing unit $12_1$ as a subscriber unit with respect to publish/subscribe unit $20_2$ so that data may be transferred from message-in portion $22_2$ to message-out portion $24_1$. An inter-unit transfer from processing unit $12_2$ to processing unit $12_3$ may be effected by operating processing unit $12_3$ as a subscriber unit with respect to publish/subscribe unit $20_2$ so that data may be transferred from message-in portion $22_2$ to message-out portion $24_3$. An inter-unit transfer from processing unit $12_2$ to processing unit $12_n$ may be effected by operating processing unit $12_n$ as a subscriber unit with respect to publish/subscribe unit $20_2$ so that data may be transferred from message-in portion $22_2$ to message-out portion $24_n$.

An intra-unit data transfer within processing unit $12_3$ to data store $16_3$ may be effected via message-out portion $24_3$. An inter-unit transfer from processing unit $12_3$ to processing unit $12_1$ may be effected by operating processing unit $12_1$ as a subscriber unit with respect to publish/subscribe unit $20_3$ so that data may be transferred from message-in portion $22_3$ to message-out portion $24_1$. An inter-unit transfer from processing unit $12_3$ to processing unit $12_2$ may be effected by operating processing unit $12_2$ as a subscriber unit with respect to publish/subscribe unit $20_3$ so that data may be transferred from message-in portion $22_3$ to message-out portion $24_2$. An inter-unit transfer from processing unit $12_3$ to processing unit $12_n$ may be effected by operating processing unit $12_n$ as a subscriber unit with respect to publish/subscribe unit $20_3$ so that data may be transferred from message-in portion $22_3$ to message-out portion $24_n$.

An intra-unit data transfer within processing unit $12_n$ to data store $16_n$ may be effected via message-out portion $24_n$. An inter-unit transfer from processing unit $12_n$ to processing unit $12_1$ may be effected by operating processing unit $12_1$ as a subscriber unit with respect to publish/subscribe unit $20_n$ so that data may be transferred from message-in portion $22_n$ to message-out portion $24_1$. An inter-unit transfer from processing unit $12_n$ to processing unit $12_2$ may be effected by operating processing unit $12_2$ as a subscriber unit with respect to publish/subscribe unit $20_n$ so that data may be transferred from message-in portion $22_n$ to message-out portion $24_2$. An inter-unit transfer from processing unit $12_n$ to processing unit $12_3$ may be effected by operating processing unit $12_3$ as a subscriber unit with respect to publish/subscribe unit $20_n$ so that data may be transferred from message-in portion $22_n$ to message-out portion $24_3$.

During normal operating conditions, each of processing units $12_n$ may use data from its respective data store $16_n$ to perform operations relating to an application (not shown specifically in FIG. 1) within each respective processing section $14n$. Each respective data store $16_n$ may be coupled directly with a respective processing unit $14_n$ (not shown in FIG. 1), or may be coupled with a respective processing unit $14_n$ via a respective communication section $20_n$ (as illustrated in FIG. 1) or may be coupled both directly with a respective processing unit $14_n$ and via a respective communication section $20_n$. If a processing unit $12_n$ experiences a disrupting condition indicating a need for updated data, the processing unit $12_n$ experiencing the disrupting condition may be regarded as a needy processing unit. Once the disrupting condition is over, the needy processing unit $12_n$ may be operated to access all data stores $16_n$ in other processing units $12_n$ via a communication section $20_n$ to obtain needed updated data appropriate to recommence processing of the application in synchrony with other processing units $12_n$ that did not experience the disrupting condition. Thus, by way of example and not by way of limitation, if processing unit $12_1$ experiences a disrupting condition indicating a need for updated data, processing unit $12_1$ may be regarded as a needy processing unit. Once the disrupting condition is over, needy processing unit $12_1$ may be operated to access a data stores $16_2$, $16_3$, $16_n$ in other processing units $12_2$, $12_3$, $12_n$ via communication sections $20_2$, $20_3$, $20_n$ to obtain needed updated data appropriate to recommence processing of the application in synchrony with other processing units $12_2$, $12_3$, $12_n$ that did not experience the disrupting condition.

Other processing units $12_n$ may likewise be regarded as a needy processing unit and may obtain updating data substantially as described above in connection with processing unit $12_1$ being a needy processing unit. In the interest of avoiding prolixity, and in the knowledge that one skilled in the art can understand those connections and arrangements, redundant descriptions as to how other processing units $12_2$, $12_3$, $12_n$ may be regarded as needy processing units obtaining updating data will not be provided here.

Figure 2:
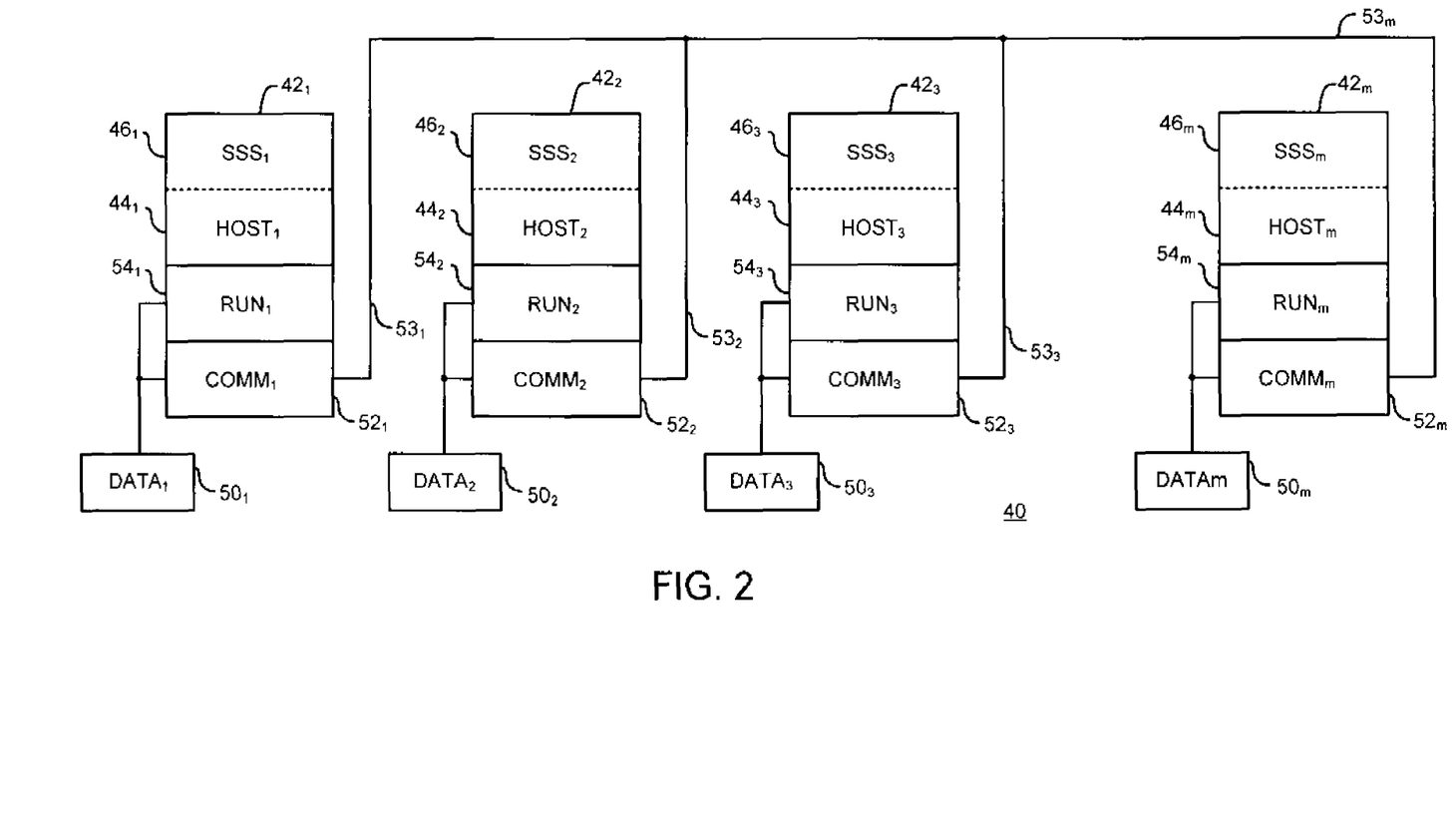
FIG. 2 illustrates the system of the disclosure.

FIG. 2 illustrates the system of the disclosure. In FIG. 2, a system 40 is described for effecting substantially synchronous operation of an application by a plurality of processing units $42_1$, $42_2$, $42_3$, $42_m$. The indicator "m" is employed to signify that there can be any number of processing units employed in system 40. The inclusion of four processing units $42_1$, $42_2$, $42_3$, $42_m$ in FIG. 2 is illustrative only and does not constitute any limitation regarding the number of processing units that may be employed with the process and system of the disclosure.

Each respective processing unit $42_m$ may include a respective host section $44_m$. Each respective host section $44_m$ may include a respective set of start-up and shut-down scripts (SSS) $46_m$. Each processing unit $42_m$ may also include a respective data store $50_m$, a respective communication section $52_m$ and a respective processing or run section $54_m$. Each respective communication section $52_m$ is preferably configured substantially as described in connection with communication section $18_n$ (FIG. 1) to include a publish/subscribe unit having a message-in portion and a message-out portion (not shown in detail in FIG. 2). Thus, processing unit $42_1$ may include a host section $44_1$ that may include set of start-up and shut-down scripts (SSS) $46_1$. Processing unit $42_1$ may also include a data store $50_1$, a communication section $52_1$ and a processing or run section $54_1$. Processing unit $42_2$ may include a host section $44_2$ that includes set of start-up and shut-down scripts (SSS) $46_2$. Processing unit $42_2$ may also include a data store $50_2$, a communication section $52_2$ and a processing or run section $54_2$. Processing unit $42_3$ may include a host section $44_3$ that includes set of start-up and shut-down scripts (SSS) $46_3$. Processing unit $42_3$ may also include a data store $50_3$, a communication section $52_3$ and a processing or run section $54_3$. Processing unit $42_m$ may include a host section $44_m$ that may include set of start-up and shut-down scripts (SSS) $46_m$. Processing unit $42_m$ may also include a data store $50_m$, a communication section $52_m$ and a processing or run section $54_m$.

Respective data stores $50_m$ may be coupled for use by respective run sections $54_m$ and may be coupled with respective communication sections $52_m$ to facilitate providing data from data stores $50_m$ to other processing units as the other processing units may be recognized as needy processing units (as described in connection with FIG. 1). Communication units $52_1$, $52_2$, $52_3$, $52_m$ may be coupled in common by communication vias or lines $53_1$, $53_2$, $53_3$, $53_m$ to facilitate transferring data among processing units $42_1$, $42_2$, $42_3$, $42_m$ as required to attend to needs of needy processing units as they appear.

System 40 preferably periodically effects a synchronizing of clocks associated with processing units $42_1$, $42_2$, $42_3$, $42_m$ to assure synchrony of data stores $50_m$, communication sections $52_m$ and run sections $54_m$. Synchrony of data stores $50_m$ may also be employed, by way of further example and not by way of limitation, in assuring that each respective data store $50_m$ employs a unique key for distinguishing its data from data contained in other data stores in system 40.

Communication among processing units $42_m$ for sharing data from various data stores $50_m$ among various run sections $54_m$ may be carried out substantially as described in connection with process 10 (FIG. 1).

Figure 3:
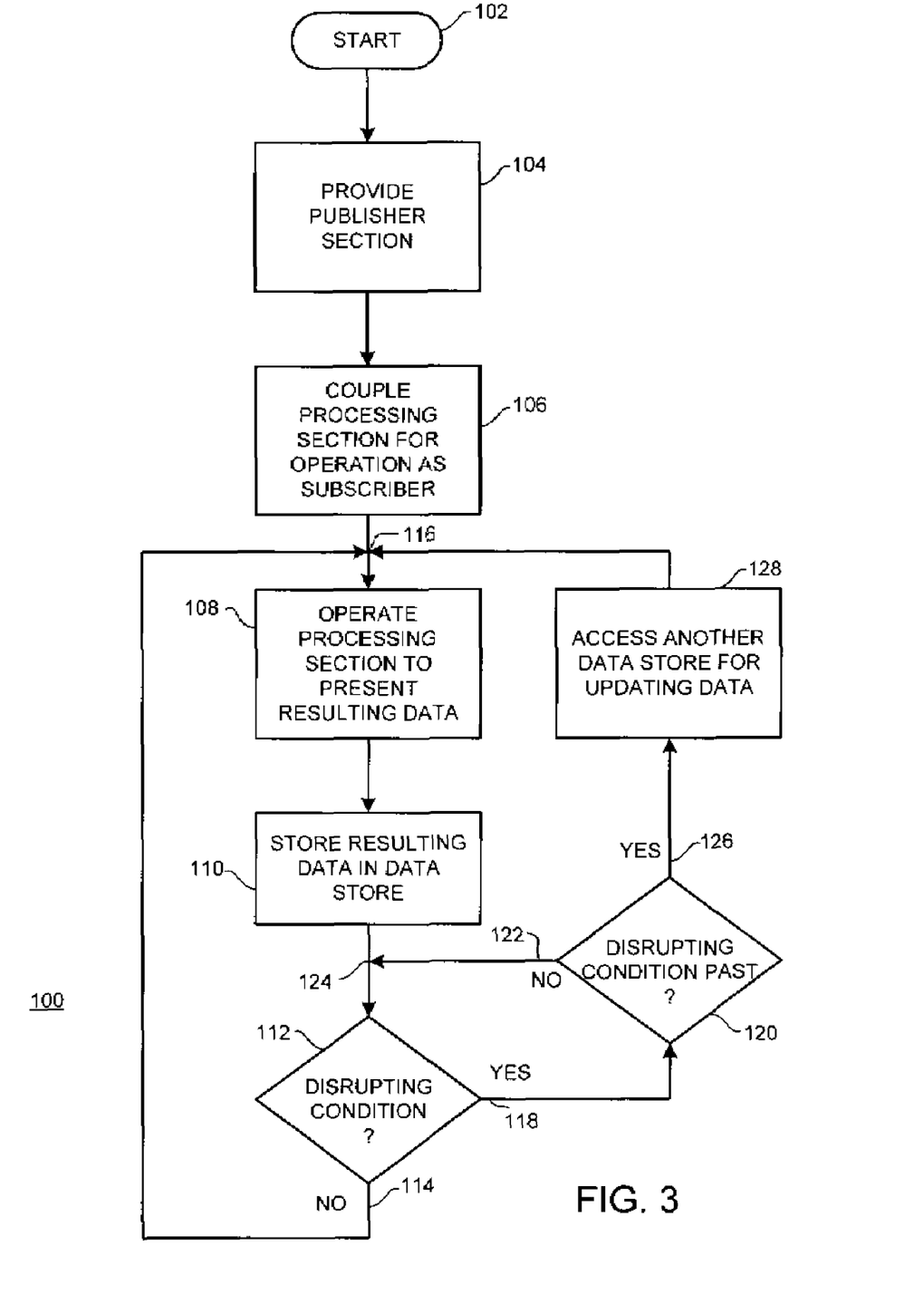
FIG. 3 is a flow chart illustrating the method of the disclosure.

FIG. 3 is a flow chart illustrating the method of the disclosure. In FIG. 3, a method 100 for effecting synchronization of data relating to an application among a plurality of processing units may begin at a START locus 102. Each respective processing unit of the plurality of processing units may include a respective processing section coupled with an own respective data store. Method 100 may continue by providing a respective publisher section coupled with the respective own data store for each respective processing unit, as indicated by a block 104. Method 100 may continue with the step of coupling each respective processing unit for operation as a subscriber to each respective publisher section in each other processing unit of the plurality of processing units than the respective processing unit, as indicated by a block 106.

Method 100 may continue with operating each respective processing unit to process information using the application to present respective resulting data, as indicated by a block 108. Method 100 may continue with storing the respective resulting data by each respective processing unit in each respective own data store, as indicated by a block 110.

Method 100 may next inquire whether any respective processing unit experiences a disrupting condition indicating a need for updated data, thereby becoming a needy processing unit, as indicated by a query block 112. If no disrupting condition has been experienced by a processing unit, method 100 may proceed from query block 112 via a NO response line 114 to a juncture 116. Method 100 may proceed from juncture 116 to operate as described above in connection with blocks 108, 110, 112. If a disrupting condition has been experienced by a processing unit, method 100 may proceed from query block 112 via a YES response line 118 to inquire whether the disrupting condition is past, as indicated by a query block 120.

If the disrupting condition is not past, method 100 may proceed from query block 120 via a NO response line 122 to a juncture 124. Method 100 may proceed from juncture 124 to operate as described above in connection with query blocks 112, 120. If the disrupting condition is past, method 100 may proceed from query block 120 via a YES response line 126 to operate the needy processing unit to subscribingly access all other data stores than the own respective data store of the needy processing unit for obtaining the updated data, as indicated by a block 128. Method 100 may proceed from block 128 to juncture 116 to continue operation as described above in connection with blocks 108, 110, 112, 120, 128.

Subscribingly accessing a data store may preferably be effected by establishing a publish-subscribe relation between the data store and the entity seeking access to data in the data store. Such a publish-subscribe relation may be established by employing a publish-subscribe program in connection with communications established between a data store and an entity seeking data from the data store.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following

I claim:

1. A method for effecting synchronization of data relating to an application among a plurality of processing units; each respective processing unit of said plurality of processing units including a respective processing section coupled with an own respective data store; the method comprising:
 (a) providing a respective publisher section coupled with said own respective data store for each said respective processing unit;
 (b) coupling each said respective processing unit for operation as a subscriber to each respective publisher section in each other processing unit of said plurality of processing units than said respective processing unit;
 (c) operating each said respective processing unit to process information using said application to present respective resulting data; (d) storing said respective resulting data by each said respective processing unit in each said own respective data store; and
 (e) if any said respective processing unit becomes a needy processing unit by experiencing a disrupting condition indicating a need for updated data, operating said needy processing unit to subscribingly access all other data stores than said own respective data store of said needy processing unit for obtaining said updated data; each said respective processing unit having access to appropriate start-up scripts and appropriate shut-down scripts to independently effect substantially automatic recovery from at least one said disrupting condition.

2. A method for effecting synchronization of data relating to an application among a plurality of processing units as recited in claim 1 wherein each said own respective data store assigns a respective unique identifier to stored data.

3. A method for effecting synchronization of data relating to an application among a plurality of processing units as recited in claim 1 wherein each said respective processing unit is configured to block access by users to said own respective data store while said respective processing unit is a needy processing unit obtaining said updated data.

4. A method for effecting synchronization of data relating to an application among a plurality of processing units as recited in claim 1 wherein said subscribingly accessing is effected with different said respective data stores of said other data stores according to a predetermined arrangement.

5. A method for effecting synchronization of data relating to an application among a plurality of processing units as recited in claim 1 wherein an updating signal path by which a respective said processing unit obtains said updated data from another said data store is a different signal path than a data read path by which a respective said processing unit effects a reading of data from said own respective data store.

6. A method for effecting synchronization of data relating to an application among a plurality of processing units as recited in claim 1 wherein each said respective processing unit has access to appropriate start-up scripts and appropriate shut-down scripts to independently effect substantially automatic recovery from at least one said disrupting condition.

7. A method for effecting synchronization of data relating to an application among a plurality of processing units as recited in claim 6 wherein each said respective processing unit is configured to block access by users to said own respective data store while said respective processing unit is a needy processing unit obtaining said updated data.

8. A method for effecting synchronization of data relating to an application among a plurality of processing units as recited in claim 7 wherein said subscribingly accessing is effected with different said respective data stores of said other data stores according to a predetermined arrangement.

9. A method for effecting substantially synchronized operation of an application by a plurality of processing units; each respective processing unit of said plurality of processing units including a respective application processing section coupled with a respective own data store coupled with a respective communication section; each said respective communication section being coupled for effecting communications with other processing units of said plurality of processing units than said respective processing unit; the method comprising:
(a) operating each said respective processing unit to store data relating to said operation of said application in said respective own data store;
(b) recognizing a respective said processing unit experiencing an anomalous event disruptive of data as a needy processing unit; and
(c) when said anomalous event is past, operating said needy processing unit to effect access to all other data stores than said own data store to obtain updated data; said access being effected by said needy processing unit operating as a subscriber unit communicating with respect to said other data stores, each respective other said data store operating as a publisher unit; each said respective processing unit having access to appropriate start-up scripts and appropriate shut-down scripts to independently effect substantially automatic recovery from at least one said anomalous event.

10. A method for effecting substantially synchronized operation of an application by a plurality of processing units as recited in claim 9 wherein each said own respective data store assigns a respective unique identifier to stored data.

11. A method for effecting substantially synchronized operation of an application by a plurality of processing units as recited in claim 9 wherein each said respective processing unit is configured to block access by users to said own respective data store while said respective processing unit is a needy processing unit obtaining said updated data.

12. A method for effecting substantially synchronized operation of an application by a plurality of processing units as recited in claim 9 wherein said accessing by said needy processing unit is effected with different said respective data stores of said other data stores according to a predetermined arrangement.

13. A system for effecting substantially synchronous operation of an application by a plurality of processing units; the system comprising:
(a) in each respective processing unit of said plurality of processing units:
(1) a respective application processing section;
(2) a respective own data store coupled with said respective application processing section; and
(3) a respective communication section coupled with at least one of said respective own data store and said respective application processing section; and
(b) communication access vias coupling each said respective communication section for effecting communications with other processing units of said plurality of processing units than said respective processing unit;
each said respective processing unit storing data relating to operation of said application in said respective own data store; said plurality of processing units being configured so that when a disrupting event renders a respective processing unit a needy processing unit, said needy processing unit may access all other said data stores than said own data store to obtain updated data; said needy processing unit operating as a subscriber unit communicating with respect to said other data stores, each respective other said data store operating as a publisher unit; each said respective processing unit having access to appropriate start-up scripts and appropriate shut-down scripts to independently effect substantially automatic recovery from at least one said anomalous event.

14. A system for effecting substantially synchronous operation of an application by a plurality of processing units as recited in claim 13 wherein each said own respective data store assigns a respective unique identifier to stored data.

15. A system for effecting substantially synchronous operation of an application by a plurality of processing units as recited in claim 13 wherein each said respective processing unit is configured to block access by users to said own respective data store while said respective processing unit is a needy processing unit obtaining said updated data.

16. A system for effecting substantially synchronous operation of an application by a plurality of processing units as recited in claim 15 wherein said accessing by said needy processing unit is effected with different said respective data stores of said other data stores according to a predetermined arrangement.

17. A system for effecting substantially synchronous operation of an application by a plurality of processing units as recited in claim 13 wherein said accessing by said needy processing unit is effected with different said respective data stores of said other data stores according to a predetermined arrangement.

* * * * *

UNITED STATES PATENT AND TRADEMARK OFFICE
CERTIFICATE OF CORRECTION

PATENT NO.         : 7,644,306 B2                                                             Page 1 of 1
APPLICATION NO.    : 11/611217
DATED              : January 5, 2010
INVENTOR(S)        : Stephen Lynn Gendro It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this

Sixteenth Day of November, 2010

David J. Kappos
*Director of the United States Patent and Trademark Office*